United States Patent Office

2,805,121
Patented Sept. 3, 1957

2,805,121
MANUFACTURE OF ZIRCONIUM TETRAFLUORIDE CATALYST

Cyril Woolf, Long Island City, N. Y., assignor to Allied Chemical & Dye Corporation, New York, N. Y., a corporation of New York No Drawing. Application February 17, 1954,
Serial No. 411,016

4 Claims. (Cl. 23—88)

This invention relates to manufacture of catalytic materials particularly active in promoting reactions in which halogen compounds are reactants and/or products. More specifically, the invention is directed to methods for making zirconium fluoride catalysts which are active in altering the halogen content of organic carbon compounds containing halogen.

Antimony fluoride and mixtures thereof with antimony chloride have been used in promoting e. g. fluorination of aliphatic halides with HF to bring about substitution of halogen other than fluorine by fluorine. These operations, though commercially successful, are nonetheless characterized by certain disadvantages arising by reason of corrosiveness, liquid form, and high volatility of antimony halides, the latter factor leading to substantial operational difficulties. Aluminum chloride has been proposed for catalyzing disproportionation (redistribution of halogen among the molecules of compounds containing more than one variety of halogen atom) but yields have not been as high as desired, and also aluminum chloride is limited with respect to operation at high temperature by high volatility. For conducting hydrohalogenation (addition of hydrogen halide to a double bond to produce saturation) or dehydrohalogenation (removal of hydrogen halide from adjoining carbon atoms to produce an unsaturated linkage), catalysts such as chromium trifluoride, gaseous free oxygen and activated carbon have been proposed but such processes encounter the disadvantage of necessity of high reaction temperature or undesirably low conversion or, as in the case of the gaseous oxygen catalyst, lack of ease of manipulation and control.

General objects of this invention include development of methods for preparing zirconium fluoride ($ZrF_4$) catalytic materials which are solids, which are effective in promoting certain types of reactions involving alteration of the halogen (e. g. fluorine) content of organic carbon halogen-containing compounds, such as fluorination of halogenated organic compounds with HF, disproportionation, hydrohalogenation and dehydrohalogenation, and which are free of the disadvantages of liquid or gaseous catalysts, and which effect good yields and conversions of sought-for products.

Zirconium tetrafluorides may be made for example in a liquid phase operation by reaction of zirconium tetrachloride and liquid hydrofluoric acid, or in a gas phase operation by HF gassing, at certain temperature conditions, of zirconium tetrachloride. Investigations out of which this invention arises demonstrate that zirconium tetrafluorides in general possess catalytic potentialities with regard to promotion of reactions of the type above noted, and that catalytic properties of zirconium tetrafluorides may vary mostly with regard to the nature of the zirconium tetrachloride starting material and to the manner in which the tetrachloride is converted to the tetrafluoride, and also to some lesser but notable extent in certain instances as to the type of reaction which the zirconium tetrafluoride is employed to catalyze. The instant development work shows that there are significant differences as to activity between the various zirconium tetrafluoride catalysts which may be made by treatment of solid zirconium tetrachlorides with gaseous HF. The improvement afforded by the present invention are based largely on the primary discovery that the catalytic activity differences between various zirconium tetrafluoride catalysts which may be made by gas phase methods are attributable primarily and to a major extent to the nature of the zirconium chloride (herein intended to denote $ZrCl_4$ and no other form of zirconium chloride) starting material, and probably secondarily to the nature or characteristics of the particular procedures used to convert the zirconium tetrachloride to the tetrafluoride.

The only kind of zirconium chloride currently available commercially is in the form of a fine powder. Such a material may be gassed with HF under substantially anhydrous and certain other conditions to convert the $ZrCl_4$ to $ZrF_4$. The resulting product has catalytic properties, and may be used to catalyze some halogen exchange reactions in certain types of reactions with acceptable results. Procedural factors of practice of this invention involve gassing of a certain $ZrCl_4$ starting material with anhydrous HF under particular hereinafter detailed conditions to form a $ZrF_4$ catalyst. Although the exact reasons for differences between catalytic activity of $ZrF_4$ catalysts made from commercial $ZrCl_4$ on the one hand and the $ZrF_4$ catalysts of this invention are not clearly known or understood, in accordance with the invention, it has been found that the use in the foregoing procedure of a certain $ZrCl_4$ starting material results in the production of a $ZrF_4$ catalyst which is highly active in promoting certain halogen exchange reactions, particularly fluorination with HF.

Commercial zirconium tetrachloride is made in operations which involve chemically forming $ZrCl_4$ at high temperatures substantially higher than the sublimation temperature of solid $ZrCl_4$, and the condensation of $ZrCl_4$ out of the resulting gas stream which contains $ZrCl_4$ vapor, and a relatively large volume of other gases and vapors. Thus, the manufacturing process is such that the $ZrCl_4$ is deposited or condensed out of its carrying gas stream and recovered in the commercially available form of discrete particles of fine powdery texture. As distinguished from a fine powder, the $ZrCl_4$ utilized as starting material to make the $ZrF_4$ catalysts of the invention may be defined in general as initially having been derived as a solid coherent mass, e. g. as a solid coherent massive material formed as a solid sublimate.

More particularly, the $ZrCl_4$ starting material which is subjected to treatment with gaseous hydrogen fluoride to produce the $ZrF_4$ catalysts of the instant improvements may be considered as material having been formed by condensing, in a condensing zone, sublimed vapor of the sublimation of zirconium tetrachloride in an anhydrous inert gaseous atmosphere under conditions to form anhydrous zirconium tetrafluoride in the form of a solid coherent mass incrusted on and adhering to the cooling surfaces of the condensing zone.

Sublimation apparatus suitable for use to produce the $ZrCl_4$ starting material may comprise a metal heating pot or boiler provided with a valved inlet pipe for nitrogen or other inert gas opening into the gas space of the pot, and with heating equipment adequate to raise temperature in the pot high enough, e. g. 300–375° C., to vaporize zirconium tetrachloride. The top of the boiler may be connected thru a vapor line with a condenser equipped with suitable cooling means. The upper end of the condensing zone communicates with a valve controlled overhead gas offtake line which discharges to the atmosphere. The offtake line may have associated therewith a manometer arranged to indicate gas pressure in the gas space in the boiler, in the condenser and in the connecting piping. Also, there may be connected to the discharge line any suitable device, such as a water wash tube, for detecting the presence of $ZrCl_4$ in the exit gas.

In accordance with the invention, the best $ZrCl_4$ to be used as starting material is the solid substantially anhydrous $ZrCl_4$ which is formed by condensing the sublimed vapor of zirconium tetrachloride in an atmosphere consisting substantially of its own vapor. However, production of $ZrCl_4$ sublimate in this manner may present some practical difficulties arising from non-feasibility of making and operating sublimation equipment which is effective to wholly prevent infiltration into the vapor spaces of the still and condenser of small amounts of atmospheric air and its included moisture. It has been found that the conditions needed for production of the herein $ZrCl_4$ starting materials comprise the conjunctive relation of the formation of $ZrCl_4$ vapor by the sublimation of solid $ZrCl_4$ e. g. the commercially available powdery material, in which operation the $ZrCl_4$ vapor is not subjected to relatively high temperature, i. e. maximum temperature of vapor does not greatly exceed sublimation temperature; maintenance in the condensing zone of anhydrous inert conditions; and insuring in the condensing zone the absence of gas or vapor, other than the $ZrCl_4$ vapor being condensed, in amount in excess of about 5 mol percent of the total vapor-gas mixture in the condensing zone.

At the outset of operation for making the preferred $ZrCl_4$ starting material for catalyst manufacture, zirconium tetrachloride, e. g. the powdery commercial product, is charged into the pot. The heating pot, condenser and associated piping are swept of air and moisture by initial flow of an anhydrous inert gas, such as nitrogen, thru the apparatus for a time interval sufficient to effect thorough purge. The valve in the nitrogen inlet line opening into the pot vapor space is closed. Heating of the $ZrCl_4$ in the pot and corresponding condensation of $ZrCl_4$ vapor in the condenser are commenced. Shortly thereafter and as soon as the condenser exit indicates escape of $ZrCl_4$ vapor, the valve in the exit pipe is closed or left just slightly cracked. Subsequently, condensation of $ZrCl_4$ vapor in the condenser is effected in an atmosphere consisting substantially of its own vapor.

It has been found that the type of $ZrCl_4$ catalyst manufacture starting material hereindescribed may be produced by condensation of $ZrCl_4$ vapor in an atmosphere which permissibly contains the above indicated relatively small amount of inert gas or vapor other than $ZrCl_4$ vapor. This phase of the present improvements is important from a practical viewpoint because it becomes feasible to operate the entire apparatus system under a low positive pressure. The resulting advantage is that it is thus possible to use apparatus which is reasonably well constructed but not more expensively designed and built for the purpose of insuring complete exclusion of extraneous gas and vapor infiltration into the condensing zone. Nitrogen or other anhydrous inert gas may be permitted to flow continuously thru the apparatus, and the desired $ZrCl_4$ sublimate may be obtained provided the rate of flow of gas is controlled so that during a given operation, the amount of anhydrous inert gas, e. g. nitrogen, in the vapor spaces of the apparatus does not exceed about 5 mol percent of the total inert gas-$ZrCl_4$ vapor mixture present. Such condition can be obtained readily by suitable adjustment of the nitrogen inlet valve with respect to the amount of $ZrCl_4$ being vaporized in a given operation.

Ordinarily the desired low positive pressure in the system may be maintained when the amount of inert anhydrous gas is appreciably less than the maximum 5 mol percent indicated. Thus, in apparatus usually employed, rate of inert gas flow thru the system may be regulated, by adjustment of the valve of the inert gas inlet pipe, so that the manometer associated with the condenser gas exit pipe indicates a perceptible plus pressure such as a positive pressure of about 0.1 to 0.5 inches of water, ordinarily about 0.2 inches. Under the foregoing circumstances, assuming customary condenser design and a condenser exit pipe not having an unusually large cross-section, the amount of inert gas passing through the system usually does not exceed say 2–3 mol percent of the total gas-vapor mixture present. When proceeding in this manner, the $ZrCl_4$ starting material used in practice of the invention to form the $ZrF_4$ catalysts is a material which has been formed by condensing, in a condensing zone, sublimed vapor of zirconium tetrachloride in an atmosphere of the group consisting of the $ZrCl_4$ vapor itself, and a mixture of such vapor, and a quantity of anhydrous inert gas in amount not more than is needed to maintain the condensing zone under positive pressure high enough to prevent infiltration of extraneous gas and vapor from the atmosphere, which amount is ordinarily substantially less than the indicated 5 mol percent maximum.

It is believed that the efficacious characteristics of the $ZrCl_4$ sublimate produced as above described are attributable more to the physical than to the chemical characteristics of the sublimate. However, there are some indications that liquid bottoms in the heating pot may retain some substances which, if permitted to sublime over into the condenser, would deleteriously affect the desired characteristics of the sublimate. Accordingly, it is preferred to terminate the sublimation operation at a point at which there is left in the heating pot a heel of not less than 10% by weight of the original commercial $ZrCl_4$ charged into the pot.

The next phase of operation boadly involves transfer of the $ZrCl_4$ sublimate formed in the condenser to a reactor in which the $ZrCl_4$ is to be converted by HF gassing to the $ZrF_4$ catalysts of the invention. More particularly, the condenser sublimate is gouged, chipped, or otherwise removed from the walls of the condenser cooling surface, and the lumps of sublimate thus obtained are granulated and sized suitably for use in the $ZrCl_4$—HF gassing reactor. The granulatable characteristics of the lumps removed from the condenser constitute an outstanding practical advantage which will hereinafter appear.

Granulation and sizing is a matter more or less of practical consideration, but preferably the $ZrCl_4$ sublimate lumps should be granulated and sized to about thru 4 on 12 to 30 mesh. If some penalty in the quality of the ultimate $ZrF_4$ catalysts is permissible, as may be the case in some circumstances, transfer of sublimate from the condenser to the $ZrCl_4$—HF gassing reactor may be effected under atmospheric conditions if done as promptly as possible and accompanied by practicably feasible precautions to minimize contact of the $ZrCl_4$ sublimate in the condenser with atmospheric air. However, practice indicates that consistent and best results are obtained where transfer of the $ZrCl_4$ sublimate from the condenser to the $ZrCl_4$—HF gassing reactor is effected completely in an anhydrous, inert gaseous atmosphere such as an atmosphere of anhydrous nitrogen. Mechanical technique for making such transfer is known. Thus, it is preferred to make the $ZrCl_4$ transfer described under conditions such that at the outset of the subsequently described HF fluorination of the $ZrCl_4$ sublimate, the $ZrCl_4$ sublimate from the condenser will have been maintained, during any interval between condensation and initiation of fluorination, in an anhydrous inert atmosphere.

Conversion of the above described $ZrCl_4$ to the $ZrF_4$ catalysts of the invention may be effected for example in a tubular nickel reactor provided with inlet and outlet connections for a gas stream, with means for externally cooling the reactor as by a blast of air, and with an externally arranged electrical resistance heater to furnish heat to the reactor as may be needed in the later phase of conversion.

The preferred fluorinating agent employed is anhydrous gaseous hydrogen fluoride, although anhydrous gaseous boron fluoride ($BF_3$) may also be used.

Conversion of the $ZrCl_4$ starting material to the $ZrF_4$ catalysts comprises provision of a reaction zone containing the solid anhydrous zirconium tetrachloride starting material described, introducing into the zone a stream of anhydrous gaseous fluorinating agent, and contacting the same in the reactor with the zirconium tetrachloride. Reaction temperature is maintained in the zone effectively high enough to cause substantial reaction between the fluorinating agent and the zirconium tetrachloride but low enough to prevent, particularly in the early stage of the conversion, appreciable volatilization of the zirconium tetrachloride. Introduction of the gas stream and contact thereof in the reactor with the zirconium tetrachloride is continued for a time long enough and in the presence of sufficient fluorinating agent to convert at least substantially more than a major proportion of the tetrachloride to zirconium tetrafluoride catalyst.

In instances where the zirconium tetrachloride starting material is disposed in a bed in a reaction zone, and a gas stream comprising fluorinating agent is passed through the bed, the chemical reaction between the solid $ZrCl_4$ and the gaseous fluorinating agent initially will be usually concentrated in the upstream portion of the bed and thereafter gradually travel in a downstream direction thru the bed. Inasmuch as the conversion reactions are generally exothermic, particularly in the early stages of conversion, progress of the reaction may be followed approximately by noting the zone of maximum temperature, i. e. the "hot spot" in the zirconium tetrachloride bed by means of suitably arranged thermocouples. Reaction temperatures may be controlled at levels desired by supplying external cooling in the initial stage and external heating in the final stage if required.

Temperatures are maintained sufficiently high to bring about reaction between the $ZrCl_4$ and fluorinating agent, and preferably high enough to effect ultimate substantially complete conversion of zirconium tetrachloride to the tetrafluoride. Although not practically desirable, by limiting the flow of fluorinating agent or mixing the same with an inert diluent such as nitrogen, the conversion operation throughout may be effected at temperature of about only a little above room temperature, i. e. as low as about 20° C. The conversion reactions ordinarily progress in what may be considered as two fairly distinct phases. In the first, assuming use of HF fluorinating agent, incoming HF is substantially entirely consumed and the tail gas is substantially all HCl and little or no HF. End of the first reaction phase and commencement of the second is indicated by the beginning of an appreciable decrease of HCl content and an appreciable increase of HF content in the tail gas, at which time the "hot spot" will have moved to the downstream end of the reactor. During the first phase, exothermic characteristics are more pronounced and tendency for $ZrCl_4$ volatilization is greater. Accordingly, the objective of temperature control during the first phase is of major importance. It has been found that the better overall results are obtained when temperatures during the first phase are maintained at a maximum (hot spot) in the range of about 30–150° C., usual practice being that hot spot temperature is held within the approximate range of 100° C. to 120° C. The desired temperature regulation may be had by control of HF gas flow thru the reactor, external cooling, or external heating if needed, or by any combination of these factors.

After completion of the first $ZrCl_4$—HF reaction phase, tendency of $ZrCl_4$ toward volatilization decreases markedly. In order to reduce reaction time and to obtain quantitative completion of reaction, maximum temperature may be raised gradually to preferably not higher than about 300° C., about 250° C. being the usually preferred maximum temperature utilized in conversion of the $ZrCl_4$ to $ZrF_4$. End-point of reaction is indicated by the substantial absence of HCl in the reactor gas.

Time of reaction is that needed, depending upon the particular temperatures used, to effect substantial conversion of $ZrCl_4$ to $ZrF_4$. Thus, HF gassing is effected and continued for a period such that the final zirconium tetrafluoride product has a $ZrF_4$ content of at least 95%, ordinarily this value being about 98% and higher. In a practical operation, HF gassing during first phase may extend over a time interval from 1 to 4½ hours, and the time needed in the second phase may lie within the range of 0.5 to 3½ hours, time requirement for each phase depending largely upon the particular operation at hand and other variables such as temperature and the desired rapidity of completion of the operation.

An advantage of the herein catalyst preparation method is that the conversion operation may be and normally is carried out at atmospheric pressure. However, super-atmospheric or sub-atmospheric pressures may be utilized if desired, although no particular advantage will ordinarily be obtained thereby. Reaction between fluorinating agent and zirconium tetrachloride at the outset may be quite intense, sometimes causing the development of an excessive amount of heat. In such cases, it may be desirable to reduce the partial pressure of fluorinating agent in the gas stream (and simultaneously the reaction intensity) by diluting the fluorinating agent with a suitable inert gas such as nitrogen. During latter portions of the HF gassing treatment when reaction tends to be less intense, use of inert gas may be discontinued and substantially pure fluorinating agent employed.

In catalytic work, size and other physical properties, e. g. resistance to crushing, of pellets or granules of the catalyst is recognized as being of substantial importance. According to these improvements, the zirconium tetrachloride which undergoes HF gassing treatment does not appreciably change in granule size, distribution or structural strength. Hence, the zirconium tetrafluoride catalyst granules advantageously have substantially the same properties, for example mesh size distribution of the particles and crushing resistance, as the original tetrachloride starting material.

The zirconium tetrafluoride of the invention, although composed of lumps or other discrete particles of substantial size, when examined even by the highest powered optical microscopes, appear to be of non-crystalline or "amorphous" structure. When these amorphous, by ordinary standards, zirconium fluorides are examined using X-ray diffraction technique, such materials are found to be bordering on the amorphous condition, and are extremely small sub-microscopic crystals which are designated in the art as "crystallites." The $ZrF_4$ catalysts of the invention are catalytically useable size (mesh) increments, e. g. granules or pellets, which are constituted of such "amorphous" zirconium fluoride having crystallite size. The desired catalytic activity prevails in zirconium fluorides of crystallite size of about 400 Angstrom units radius or below. As crystallite size decreases below this value, desired catalytic activity increases and particularly preferred zirconium fluorides include those having crystallite size of about 150A and below, as determined by X-ray diffraction technique. The foregoing crystallite structures are characteristic of zirconium tetrafluoride when made from $ZrCl_4$ in general as distinguished from other compounds of zirconium. Such structure characteristics are in marked contrast to the structure characteristics of zirconium tetrafluorides made from zirconium compounds other than the zirconium tetrachlorides. While zirconium tetrafluorides made from compounds other than zirconium tetrachlorides may consist of lumps or smaller discrete particles, such lumps or particles in turn are composed of $ZrF_4$ crystals of relatively large size, i. e., not less than about 1000 and usually several thousand Angstrom units radius and above.

The crystallite $ZrF_4$ materials of the invention possess highly active catalytic properties, and are particularly effective in promoting fluorinating reactions and may be utilized to catalyze other reactions involving alteration of the halogen (e. g. fluorine) content of organic halogenated compounds, such as disproportionation, hydrohalogenation and dehydrohalogenation. Comparative examples given below show that the ZrF$_4$ catalysts of the invention, in typical fluorination operations, effect greater reaction of HF than do ZrF$_4$ catalysts made from commercial ZrCl$_4$ and also production of substantial quantities of more highly fluorinated products not formed by ZrF$_4$ catalysts made from commercial ZrCl$_4$.

There is no definite knowledge as to the factors to which the improved results afforded by the invention are attributable. Investigations do indicate that while ZrF$_4$ may be made by HF gas treatment of the basic zirconium chloride, i. e. ZrOCl$_2$ plus water of hydration, from practical viewpoint, such ZrF$_4$ is catalytically ineffective when used in the form of unsupported catalysts. Accordingly, there appears to be at least some basis for the theory that the selection of the particular herein-described ZrCl$_4$ starting material together with the procedural steps of the invention as a whole are such as to substantially insure the absence in the ZrCl$_4$—HF gassing operation of any compound of the nature of the ZrOCl$_2$ hydrate, and corresponding absence in the product of catalytically inactive material in the final ZrF$_4$ product. In connection with possible deleterious effect of the presence of ZrOCl$_2$ hydrate at least in the manufacture of ZrF$_4$ catalyst to be used in unsupported form, it is noted that the ZrCl$_4$ starting material of this invention, prior to HF gas treatment, is in the form of lumps which may be granulated and thus easily changed to physical structure readily susceptible to HF gas treatment, and that such structure is retained throughout HF gassing, with the finished ZrF$_4$ being in physical condition directly useable as a catalyst, all without pelleting. Since the ZrCl$_4$ starting material of the invention is granular in structure, no pelleting prior to HF gassing is necessary, and hence the likelihood of the formation of at least some of the ZrOCl$_2$ hydrate during pelleting is avoided.

The following exemplifies formation of the particular ZrCl$_4$ starting material employed in pratice of the present improvements, manufacture of ZrF$_4$ catalyst of the invention, and use of such catalyst in a typical fluorination operation, parts and percentages being by weight unless otherwise noted.

*Example 1.*—The ZrCl$_4$ sublimation and condensing apparatus employed was of the type which provided for continuous flow through the system of a small amount of anhydrous inert gas. Such apparatus comprised a metal heating pot having a valved gas inlet pipe opening into the vapor space of the pot, and provided with external heating means adequate to heat material in the pot to temperature of about 400° C. The top of the pot was connected thru a vapor line with a vertically disposed tubular condenser arranged to be externally air-cooled. The top of the condenser was equipped with an overhead gas off-take line discharging to the atmosphere and associated with a manometer for indicating gas pressure in the gas spaces of the heating pot and condenser, and in the connection piping.

About 700 parts of commercially obtainable ZrCl$_4$ in powdered form were charged into the heating pot. The pot, the vapor line connecting the latter to the condenser, the condenser, and the pipe connection between the top of the condenser and the manometer were completely purged of air and moisture by passing thru the apparatus for about 60 minutes a stream of completely anhydrous nitrogen, flow of which thru the apparatus to the gas outlet associated with the manometer being controlled by the valve in the nitrogen gas inlet pipe of the heating pot. After purging, the valve in the nitrogen gas inlet was closed down sufficiently to provide for no more than a low positive pressure within the apparatus. The ZrCl$_4$ in the pot was sublimed by maintaining temperature therein of about 300–350° C. The ZrCl$_4$ vapor was condensed in the air-cooled condenser, operation being continued until about 80% of the ZrCl$_4$ charged to the pot had been vaporized, i. e. until about 2.4 mols of ZrCl$_4$ had been vaporized. The ZrCl$_4$ vapor condensed as a relatively hard solid coherent mass or cake adhering to the walls of the condenser tube. All during the sublimation operation, anhydrous nitrogen was bled into and thru the pot and condenser in small quantity just enough to maintain a low positive pressure in the apparatus, the manometer reading during the operation averaging about 0.1 inch of water, this value being sufficient in this instance to prevent any infiltration into the apparatus of atmospheric air and moisture and to minimize the presence in the apparatus of any atmosphere other than that of ZrCl$_4$ vapor. The total quantity of nitrogen passed through the apparatus was such that during the entire operation the nitrogen in the system averaged about 2–3 mol percent of the total gas-vapor mixture therein.

The freshly sublimed ZrCl$_4$ was then chipped from the condenser walls as lumps of coherent material which was granulated and sized to about 4 x 14 mesh. About 550 (grm) parts (400 cc.) of the latter were charged into a 1″ I. D. nickel reactor which was fully packed throughout a length of about 31 inches. In this particular instance, the transfer of freshly sublimed ZrCl$_4$ from the condenser to the reactor was effected entirely in an anhydrous nitrogen atmosphere which was maintained continuously from completion of sublimation up to initiation of HF treatment. The foregoing illustrates formation of the ZrCl$_4$ starting material utilized in accordance with the invention to effect production of the ZrF$_4$ catalyst thereof.

The tubular nickel reactor was provided with inlet and outlet connections for a gas stream, and with means for externally cooling the reactor by a blast of air. An externally disposed electrical resistance heater was arranged to furnish heat to the reactor when needed. Gaseous anhydrous HF, initially at a rate of about 60 parts per hour, was passed thru the reactor while maintaining the maximum (hot spot) internal temperature in the reactor in the range of about 100 to not above 150° C. by adjusting the extent of reactor external cooling. Means were provided to sample the reactor effluent gas to determine the HF or HCl content. Initially the point of maximum reaction temperature was substantially at the upstream end of the bed of zirconium chloride. Exit gas from the reactor was periodically sampled, and after about 4 hours, the evolution of HCl began to slacken and HF began to appear in the reactor exit. By this time, the reactor hot spot had moved to approximately the end of the catalyst bed, and at this stage maximum temperature in the reactor was about 100° C. The flow of gaseous anhydrous HF was continued, at a rate of about 20 parts per hour, and internal temperature was gradually raised to not in excess of about 240° C. so that at the end of a further reaction period of about 3 hours, the reactor effluent gas contained only HF and was substantially free of HCl. At the end of this catalyst manufacture operation, about 394 parts of zirconium fluoride catalyst, containing about 98.5% ZrF$_4$ and less than 0.5% chlorine were obtained. With respect to granular form and mesh size, the ZrF$_4$ catalyst was the same as at initiation of HF treatment. X-ray diffraction pattern of the resulting zirconium fluoride catalyst indicated an average crystallite size of about 50 Angstrom units radius, i. e. the crystallite was so small as to be indicative of amorphous structure.

The following exemplifies use of the catalyst of the invention in a representative fluorination operation. During a period of about 5 hours, 2.08 mols of vaporized hexachloroacetone and 10.5 mols of anhydrous HF gas were simultaneously passed over 400 cc. catalyst made as described above, average reaction temperature during the run being about 340° C., and average contact time being about 2 seconds. 6 mols of HCl were produced, showing that 2.87 mols of HF had reacted per mol of hexachloroacetone. The exit gas of the reactor was handled in known manner to recover the organic products which had the following molecular composition:

Tetrafluorodichloroacetone
    $CClF_2.CO.CClF_2$ _____ 20.2% (B. P. 47° C.)
Trifluorotrichloroacetone
    $CClF_2.CO.CCl_2F$ _____ 38.6% (B. P. 83° C.)
Difluorotetrachloroacetone
    $CClF_2.CO.CCl_3$ and
        $CCl_2F.CO.CCl_2F$ _____ 26.1% (B. P. 122° C.)
Monofluoropentachloroacetone
    $CCl_2F.CO.CCl_3$ _____ 17.1% (B. P. 161° C.)

The following illustrates manufacture of a $ZrF_4$ catalyst employing commercial $ZrCl_4$ as starting material, and use of such catalyst in substantially the same fluorination operation as outlined above.

*Example 2.*—About 550 parts of powdered commercial $ZrCl_4$ were charged into a tubular nickel reactor similar to the $ZrCl_4$—HF gassing reactor of Example 1. This powdered $ZrCl_4$ was then gassed with anhydrous HF, and temperatures and all physical procedure utilized were maintained substantially the same as detailed above in Example 1 with regard to manufacture of $ZrF_4$ catalyst from freshly sublimed $ZrCl_4$. The catalyst made in accordance with the present example from powdered commercial $ZrCl_4$ contained about 98% $ZrF_4$ and less than 0.5% chlorine but was in the form of a powder substantially the same as charged into the reactor. X-ray diffraction pattern indicated average crystallite size of about 50 Angstrom units radius. This powdered $ZrF_4$ product was then compressed into pellets which were granulated and broken down and sieved. 400 cc. of this catalyst (4 x 14 mesh) were charged into the same fluorination reactor employed in Example 1. During about 5 hours 2.47 mols of vaporous hexachloroacetone and 12.2 mols of anhydrous HF gas were simultaneously passed thru the reactor. 4.88 mols of HCl were formed, indicating that 1.98 mols of HF had reacted per mol of hexachloroacetone. At this fluorination operation, reaction temperatures, time of contact, and other corresponding conditions of operation of Example 1 were substantially duplicated. The molecular composition of the organic products recovered from the procedure of present Example 2 was as follows:

|  | Percent |
|---|---|
| Tetrafluorodichloroacetone $CClF_2.CO.CClF_2$ | 0 |
| Trifluorotrichloroacetone $CClF_2.CO.CCl_2F$ | 36.8 |
| Difluorotetrachloroacetone $CClF_2.CO.CCl_3$ and $CCl_2F.CO.CCl_2F$ | 47.0 |
| Monofluoropentachloroacetone $CCl_2F.CO.CCl_3$ | 16.2 |

Comparison of the data of Examples 1 and 2 shows that the catalyst of Example 1 effected not only a greater reaction of HF, but also resulted in the production of a large quantity of the more highly fluorinated tetrafluorodichloroacetone, none of which was produced by the catalyst employed in Example 2.

I claim:

1. The process which comprises introducing into a reaction zone solid comminute anhydrous zirconium tetrachloride starting material, introducing into said zone a gaseous stream of an anhydrous fluorinating agent of the group consisting of hydrogen fluoride and boron fluoride, and contacting said stream with said tetrachloride; maintaining effective reaction temperature in said zone high enough to cause substantial reaction between said agent and said tetrachloride but low enough to prevent appreciable volatilization of said tetrachloride, continuing introduction of said gas stream and contact thereof with said tetrachloride for a time sufficient and in the presence of sufficient of said agent to convert a substantial proportion of said tetrachloride to a zirconium tetrafluoride catalyst; said material having been formed as a solid coherent mass and by condensing in a condensing zone the sublimed vapor of the sublimation of zirconium tetrachloride in an atmosphere of the group consisting of (*a*) said vapor and (*b*) a mixture of said vapor and an anhydrous inert gas in amount not in excess of about 5 mol percent of said mixture and not more than is needed to maintain said condensing zone under positive pressure high enough to prevent infiltration of extraneous gas and vapor; and said material having been maintained, during comminution and the stage between condensation and initiation of fluorination, in an anhydrous inert atmosphere.

2. The process of claim 1 in which the said material is formed by condensing in a condensing zone the sublimed vapor of zirconium tetrafluoride in an atmosphere consisting substantially of said vapor.

3. The process which comprises introducing into a reaction zone solid comminuted anhydrous zirconium tetrachloride starting material, introducing into said zone a gaseous stream of an anhydrous fluorinating agent of the group consisting of hydrogen fluoride and boron fluoride, and contacting said stream with said tetrachloride; initially maintaining said starting material at maximum temperature in the range of about 30–150° C. at least until the reaction zone exit gas shows appreciable decrease of HCl content and appreciable increase of HF content, thereafter continuing fluorination at higher temperature not in excess of about 300° C. until said exit gas contains substantially no HCl and there is formed a zirconium tetrafluoride catalyst containing at least 95% $ZrF_4$; said starting material having been formed as a solid coherent mass and by condensing in a condensing zone the sublimed vapor of the sublimation of zirconium tetrachloride in an atmosphere of the group consisting of (*a*) said vapor and (*b*) a mixture of said vapor and an anhydrous inert gas in amount not in excess of about 5 mol percent of said mixture and not more than is needed to maintain said condensing zone under positive pressure high enough to prevent infiltration of extraneous gas and vapor; and said material having been maintained, during comminution and the stage between condensation and initiation of fluorination, in an anhydrous inert atmosphere.

4. The process which comprises introducing into a reaction zone solid comminuted anhydrous zirconium tetrachloride starting material, introducing into said zone a gaseous stream of an anhydrous fluorinating agent of the group consisting of hydrogen fluoride and boron fluoride, and contacting said stream with said tetrachloride; initially maintaining said starting material at maximum temperature in the range of about 30–150° C. at least until the reaction zone exit gas shows appreciable decrease of HCl content and appreciable increase of HF content, thereafter continuing fluorination at higher temperature not in excess of about 300° C. until said exit gas contains substantially no HCl and there is formed a zirconium tetrafluoride catalyst containing at least 95% $ZrF_4$; said starting material having been formed as a solid coherent mass and by condensing in a condensing zone the sublimed vapor of the sublimation of zirconium tetrachloride in an atmosphere of the group consisting of (*a*) said vapor and (*b*) a mixture of said vapor and an anhydrous inert gas in amount not in excess of about 5 mol percent of said mixture and not more than is needed to maintain said condensing zone under positive pressure high enough to prevent infiltration of extraneous gas and vapor.

References Cited in the file of this patent

UNITED STATES PATENTS

| 1,927,108 | Zimmermann | Sept. 19, 1933 |
| 2,602,725 | Wilhelm et al. | July 8, 1952 |
| 2,618,531 | Lindblad | Nov. 18, 1952 |
| 2,695,213 | Fernelius | Nov. 23, 1954 |

OTHER REFERENCES

J. W. Mellor: vol. 7, 1927 Ed. "Inorg. and Theoretical Chem." page 144. Longmans, Green and Co., N. Y.